(12) United States Patent
Kuo

(10) Patent No.: US 7,888,908 B2
(45) Date of Patent: Feb. 15, 2011

(54) PHOTOVOLTAIC CHARGING SYSTEM

(75) Inventor: Yao H. Kuo, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 400 days.

(21) Appl. No.: 12/112,113

(22) Filed: Apr. 30, 2008

(65) Prior Publication Data
US 2009/0273309 A1  Nov. 5, 2009

(51) Int. Cl.
*H02J 7/00* (2006.01)
(52) U.S. Cl. .................. 320/108; 320/101; 320/114; 320/115
(58) Field of Classification Search ........... 320/101, 320/102, 108
See application file for complete search history.

(56) References Cited

U.S. PATENT DOCUMENTS

| 4,563,727 | A | 1/1986 | Curiel |
| 4,740,431 | A | 4/1988 | Little |
| 4,772,990 | A | 9/1988 | Linehan et al. |
| 4,882,239 | A | 11/1989 | Grimmer et al. |
| 5,387,858 | A | 2/1995 | Bender et al. |
| 5,605,769 | A | 2/1997 | Toms |
| 5,695,885 | A | 12/1997 | Malhi |
| 6,051,957 | A | 4/2000 | Klein |
| 6,084,379 | A | 7/2000 | Buniatyan |
| 6,376,764 | B1 | 4/2002 | Luo |
| 6,380,710 | B1 | 4/2002 | Watanabe et al. |
| 6,586,906 | B1 | 7/2003 | Bessa et al. |
| 7,514,899 | B2 * | 4/2009 | Deng-Peng ............. 320/101 |
| 2006/0028166 | A1 | 2/2006 | Closset et al. |
| 2006/0238365 | A1 * | 10/2006 | Vecchione et al. ......... 340/657 |
| 2007/0069684 | A1 * | 3/2007 | Ramsden ................. 320/101 |
| 2007/0182367 | A1 | 8/2007 | Partovi |

FOREIGN PATENT DOCUMENTS

EP     1246340 A1 * 10/2002
WO  2006138671 A2    12/2006

* cited by examiner

*Primary Examiner*—Edward Tso
*Assistant Examiner*—Ahmed Omar
(74) *Attorney, Agent, or Firm*—Dickinson Wright PLLC

(57) ABSTRACT

A modular charging unit that allows efficient charging of a rechargeable battery with a charging station and during use away from the charging system uses ambient energy to extend battery life of the device.

20 Claims, 7 Drawing Sheets

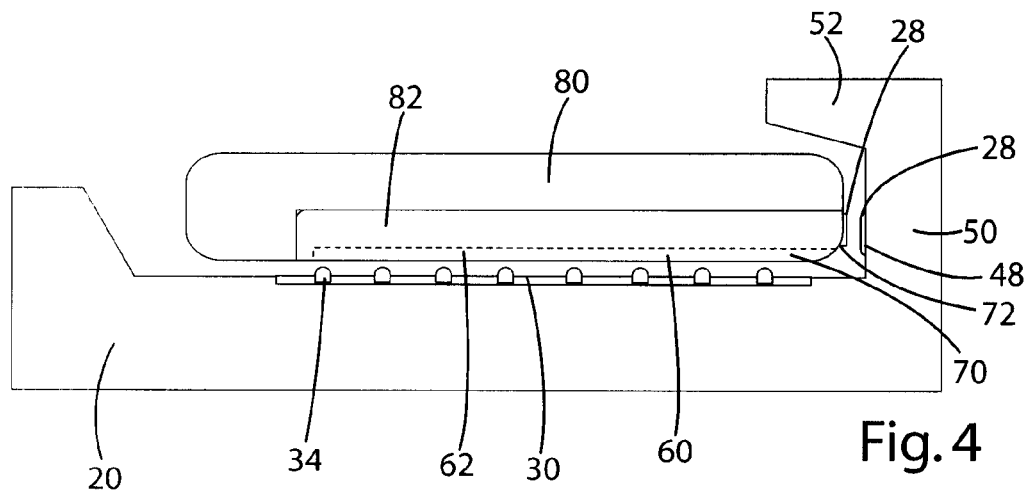
Fig. 4
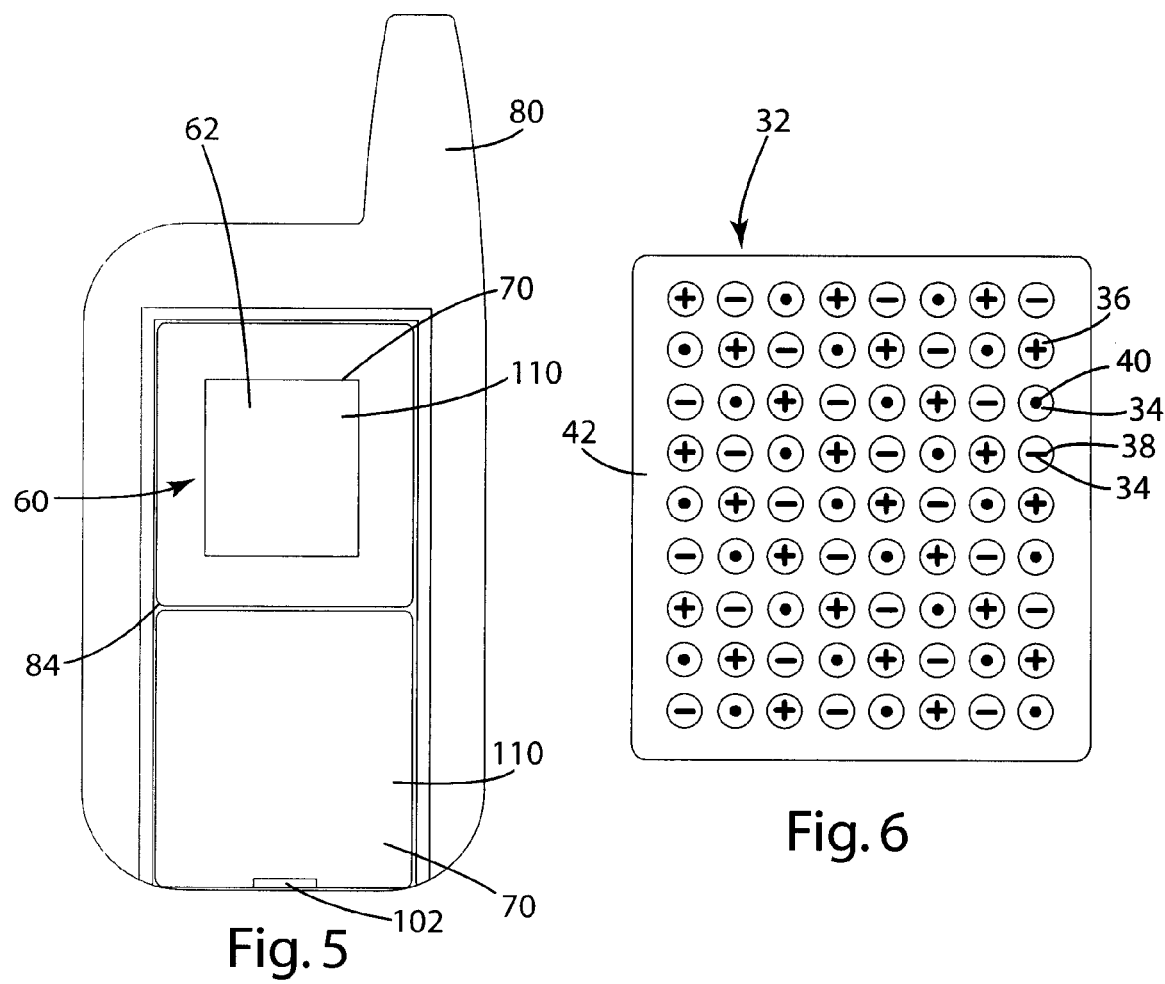
Fig. 5
Fig. 6

PHOTOVOLTAIC CHARGING SYSTEM

BACKGROUND OF THE INVENTION

1. Technical Field

This present invention is directed to a modular photovoltaic charging system that is easily adaptable to existing electronic devices. More specifically, the charging system includes a charging station capable of providing photons, and a modular charge receiver that is not only capable of receiving the photons provided by the charging system but also photons from ambient sources when the charge receiver is remote from the charging station. The modular charge receiver is also interchangeable with and capable of cooperating with other charging systems.

2. Discussion

A variety of photovoltaic devices exist in the prior art. Most prior art photovoltaic devices are large panels maximized to receive maximum sunlight to provide a maximum charge. Not only are these solar panels bulky and difficult to use, they also are unable to provide electrical energy during periods of low light, darkness, or reduced solar radiation. In addition, many of the existing photovoltaic chargers are too fragile and too large to be used easily in today's mobile society for charging the variety of electronic devices commonly used by consumers. These photovoltaic devices are also sold separately from electronic devices and separately from the batteries that power the electronic devices and do not easily integrate with mobile devices.

Today's mobile electronic devices, such as mobile phones, navigation systems, music players, and video devices are increasingly being used by consumers and increasingly being used remote from power sources. Each of these devices uses a rechargeable battery to operate and, as manufacturers continually add more functionality to these devices, the battery life or run time of the device is reduced. At the same time, consumers are increasingly relying on these devices in everyday life. As is well known, the biggest limitation to these mobile electronic devices is the battery technology and available time before the battery is incapable of powering the device. At the same time, users desire increasingly compact devices, which also limits the battery size. Therefore, the biggest consideration is the amount of battery charge available between charges. The majority of time for mobile electronic devices is spent out of direct solar radiation, such as inside buildings; in addition, prior art solar devices are configured to maximize electrical power from solar radiation and are not well suited to provide supplemental charge throughout the day to mobile devices.

Therefore, these is a need for a compact modular charging system that allows easy and efficient charging, maximizes the available energy throughout the day between charges, and is able to charge efficiently in periods darkness or low light conditions. The charger should also be interchangeable with or complimentary to other charging systems.

SUMMARY OF THE INVENTION

In view of the above, the present invention is directed to a modular photovoltaic charging system that is easily adaptable to existing electronic devices. More specifically, the charging system includes a charging station capable of providing photons and a modular charge receiver that is not only capable of receiving the photons provided by the charging system but also photons from ambient sources when the charge receiver is remote from the charging station. The modular charge receiver is also interchangeable with and capable of cooperating with other charging systems. A communication device having a first portion located on the charging station and a second portion on the charge receiver, communicate regarding the status of one of the charge receiver and charging station. If necessary, the charging station may change the wavelength of the photons to increase efficiency of the charge, depending on the type of photon receiver in use.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 4 is a side view of the charging system with an exemplary electronic device;

FIG. 5 is a rear view of an exemplary electronic device using a combination of stacked charge receivers;

FIG. 6 is an exemplary diagrammatic grid of photon producing transmitters showing different wavelength transmitting diodes using different symbols;

DETAILED DESCRIPTION OF THE PREFERRED EMBODIMENT

Figure 1:
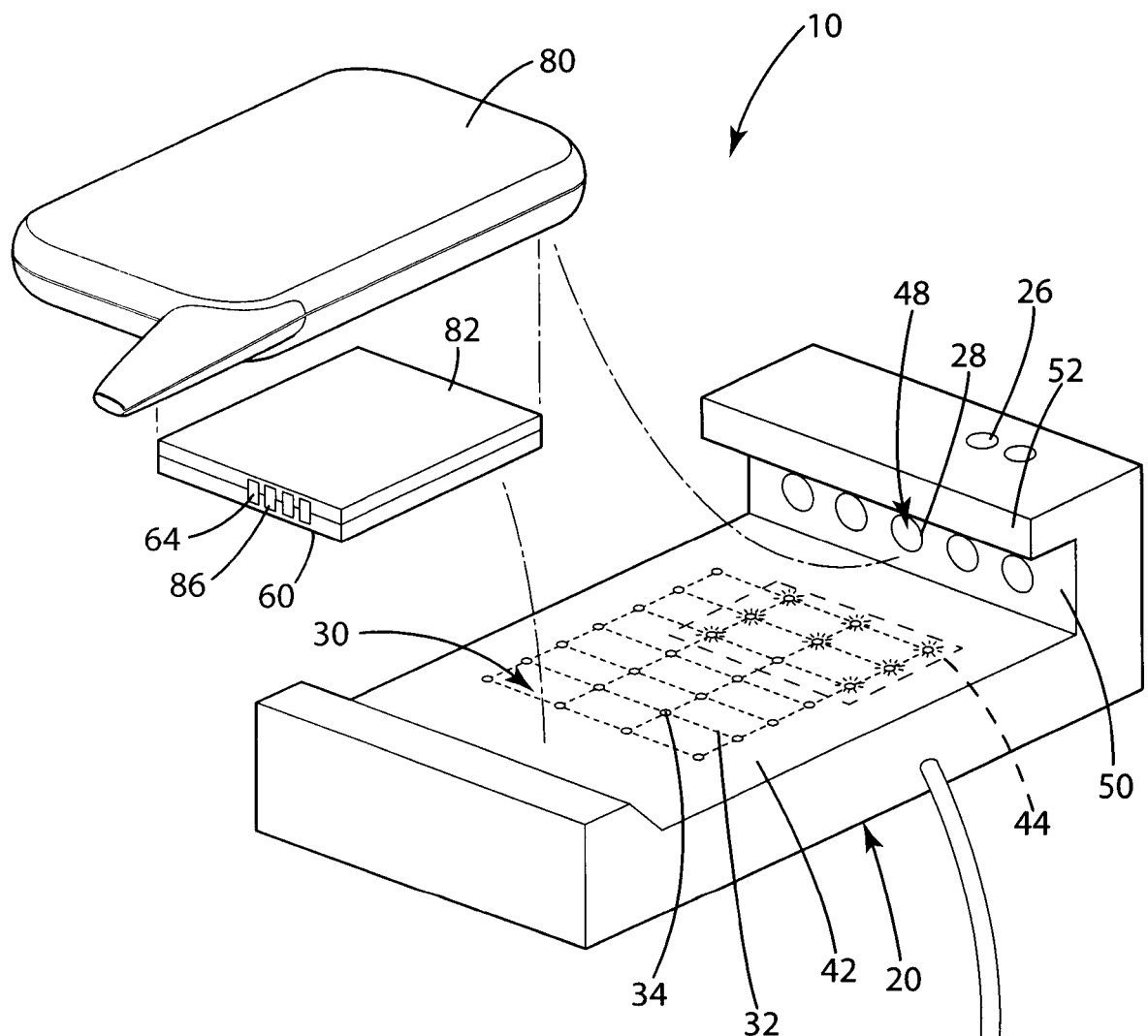
FIG. 1 is a top perspective view of the charging system as used with an exemplary electronic device.

The present invention is directed to a charging system 10 for charging electronic devices 80 having a rechargeable battery. The charging system 10 generally includes a charging station 20 capable of providing energy, specifically photons, to a charge receiver 60. The charge receiver 60 in turn provides energy to the electronic device 80 or a rechargeable battery 82. The charging system 10 is configured to allow maximum charging efficiency when the charging station 20 provides photons to the charge receiver 60, even in low ambient energy conditions. The charge receiver 60, when away from the charging station, utilizes naturally available energy by providing energy output from the energy in ambient light to extend the battery life of a mobile electronic device.

The charging station 20 may have any size, shape, or configuration, but is generally capable of providing energy output through photons. The charging station 20 includes a photon output cell 30 and a controller (not illustrated). The controller may be any controller capable of controlling the photon output of the charging station 20 and capable of being configured to provide any of the below described features or optional features of the charging station 20. The charging station 20 further includes a power supply 22 such as a plug. The charging station 20 may operate from either AC or DC current, however, as with most common portable electronic devices, it may be preferable to operate on DC current to allow easy charging within a vehicle, such as from a power outlet in a vehicle, traditionally known as a cigarette lighter. If the charging station 20 operates on DC current, the converter of AC to DC current may be integral with the plug or within the charging station 20. In general, the power supply 22 provides a conduit for the electrical energy needed to operate the charging station 20 and to provide energy through photons to the charge receiver 60.

Figure 2:
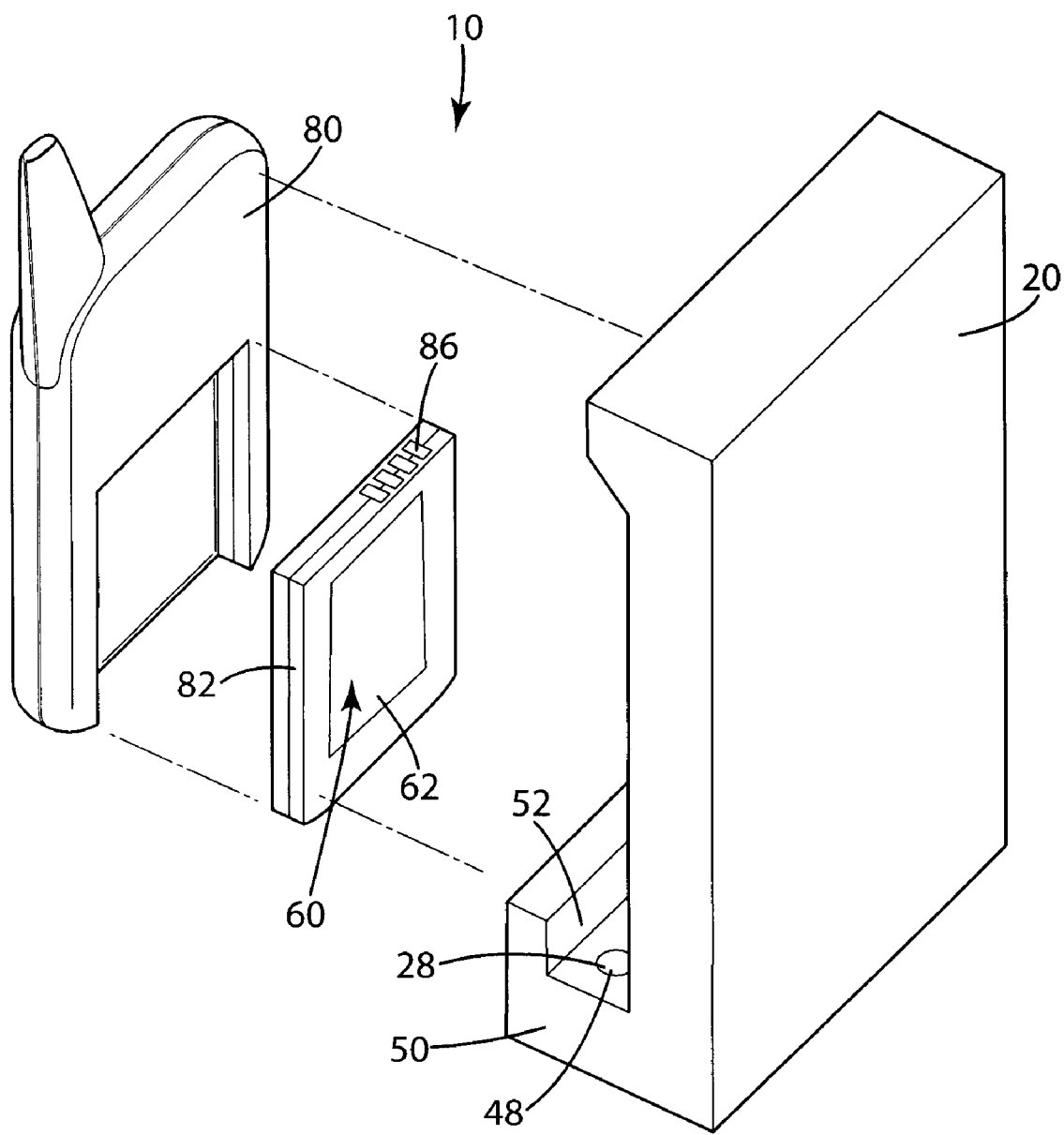
FIG. 2 is a side perspective view of the charging system as used with an exemplary electronic device.
Figure 3:
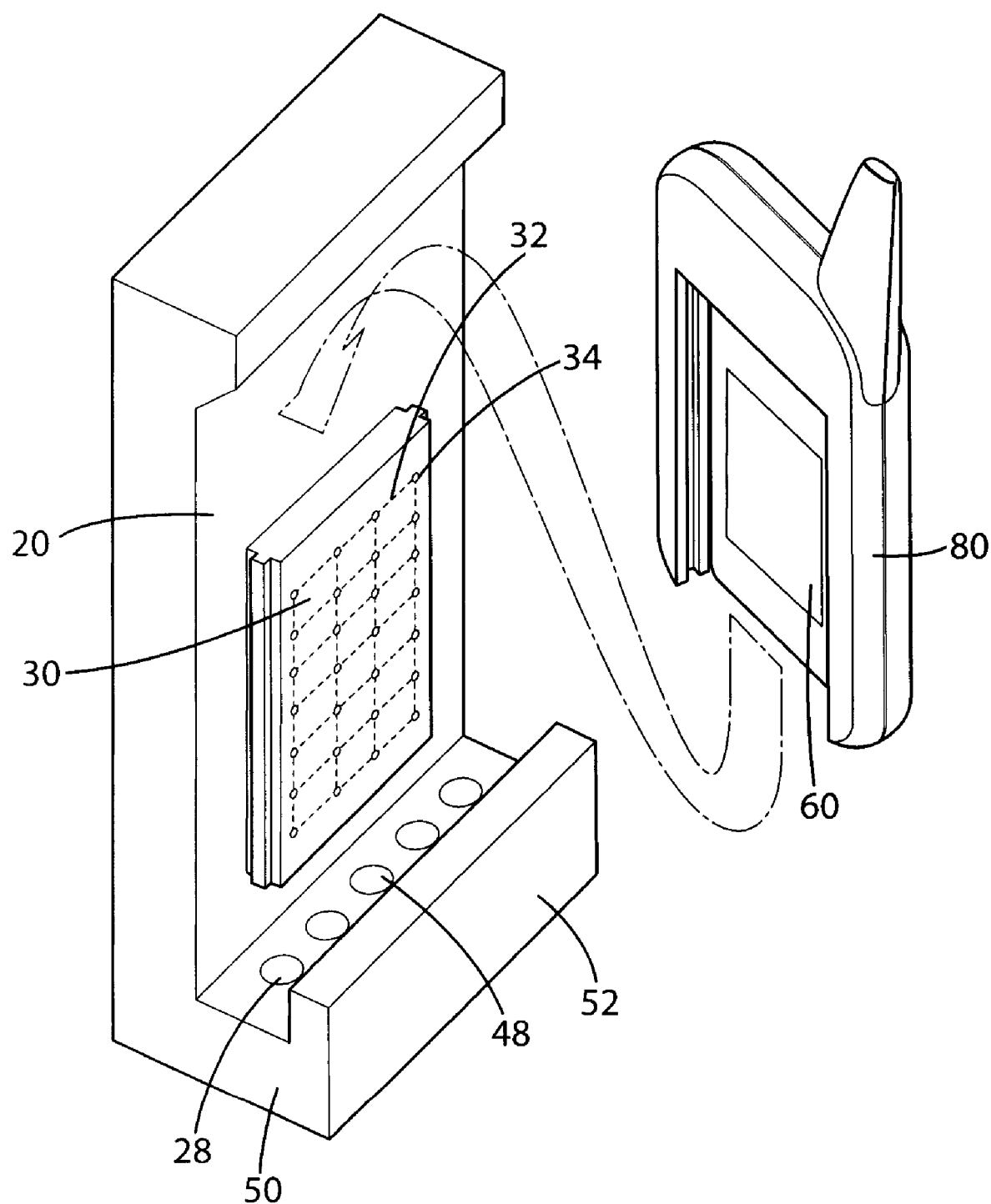
FIG. 3 is an exploded perspective view of the charging system as used with an exemplary electronic device.

The photon output cell 30 is generally any device capable of efficiently providing photons to transfer energy to a remote device, such as the charge receiver 60. The photon output cell 30 may be any size, shape, or configuration. In the illustrated embodiment, such as illustrated in FIG. 1, the photon cell 30 is compact and forms a flat surface 42 capable of supporting an electronic device 80 in need of a charge. Of course, as illustrated in FIG. 3, in some embodiments the photon output cell 30 or charging station 20 may be configured to mate with a particular electronic device 80. The advantage to a charging station 20 configured to mate with a device, as illustrated in FIG. 3, is that it may be wall mountable or advantageous to environments where the device would slide off the photon cell 30, such as due to movement, required position, or available space. In comparison, one of the advantages to the flat surface 42 as illustrated in FIG. 2 is that almost any device may be used without limitation with the charging station 20 and even devices later configured to be charged through photovoltaic energy may be used, with the flat surface 42 of photon cell 30. As further illustrated in FIG. 11, the surface 42 may be recessed relative to the surrounding surface 43 to keep the electronic device 80 positioned on the photon cell 30.

Figure 7:
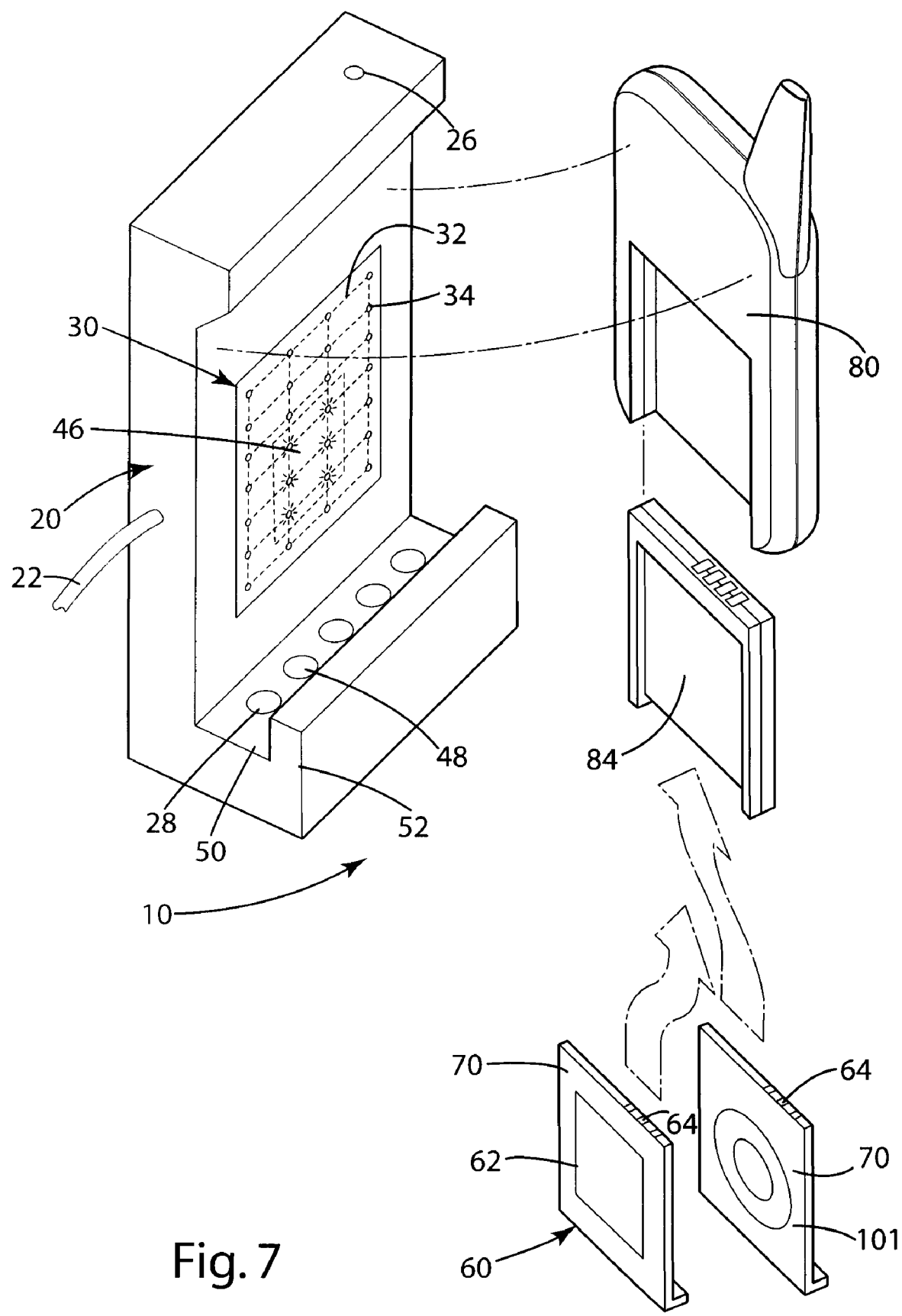
FIG. 7 is an exploded perspective view of the charging system with an exemplary electronic device and showing exchangeable charge receivers.
Figure 10:
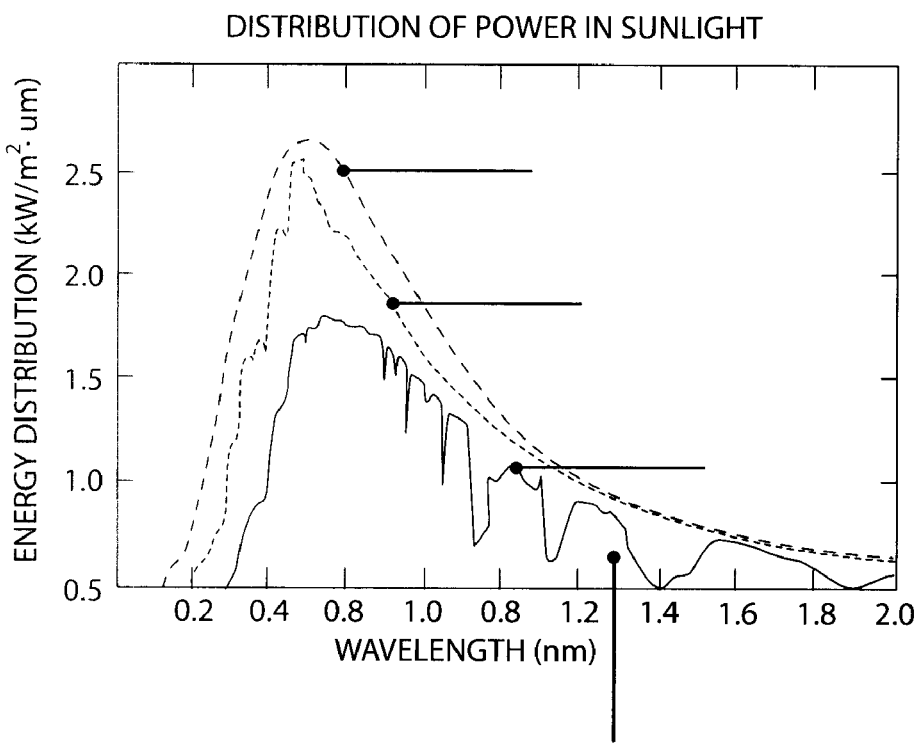
FIG. 10 is a graph of the energy distribution of the sun.

The photon output cell 30 generally includes photon transmitters 34 such as those diagrammatically illustrated in the figures. Although the photon transmitters 34 may be arranged in any pattern or randomly within the photon output cell 30 (not illustrated), it may be preferable to arrange them along a grid 32, as illustrated in the figures. When a device 80 is arranged on the photon output cell 30, the grid 32 allows the photon output cell 30 to easily adjust power to the desired photon transmitters 34 such that only the photon transmitters 34 that are capable of interacting with the device are operational. For example, in FIG. 1, a first area 44 is only active and in FIG. 7 a second area 46 is only active. The system 10 may activate any desired number of photon transmitters 34 and the areas 44, 46 shown in FIGS. 1 and 7 are only exemplary areas and are not limiting to the present invention. As further diagrammatically illustrated in FIG. 6, the photon transmitters 34 may provide different wavelengths of photon energy, such as the three different wavelength photon transmitters 34, specifically, a first transmitter 36, a second transmitter 38 and a third transmitter 40, illustrated in FIG. 6 by different symbols. More specifically, the provision of different wavelengths of photon energy allows the charging station 20 to vary the configuration or wavelength of energy being provided to the charge receiver 60. Although not required, as all photon transmitters 34 could easily provide the same wavelength photons, it is advantageous to provide photon transmitters 34 directed to different wavelengths of energy as the charging station 20 may efficiently charge a much greater variety of devices, each configured for different environmental conditions. More specifically, the charge receiver 60 may be configured to a particular wavelength pattern, such as being directed to the wavelength patterns of sunlight (illustrated in FIG. 10), tungsten, or fluorescent, and the charging station 20 to maximize efficiency may adjust to a specified wavelength pattern used by the charge receiver 60. The variance of the output energy or wavelengths of the energy allows the charging station to provide energy maximized at the wavelength in which the charge receiver 60 is most efficient in receiving energy and transferring the energy to the electronic device 80 or battery 82. The charging station 20 being able to vary the energy profile allows the charging station to configure the type of output closely to a particular lighting profile such as daylight, fluorescent lights, or tungsten lighting. More specifically, such capability of configuring the energy profile allows the use of charge receivers 60 that are configured to a particular lighting profile, thereby allowing a user to select, as described in greater detail below, a charge receiver that is configured to provide maximum energy output from the lighting profile where the user predominantly uses the electronic device, thereby maximizing the charge or energy provided for that user.

Figure 8:
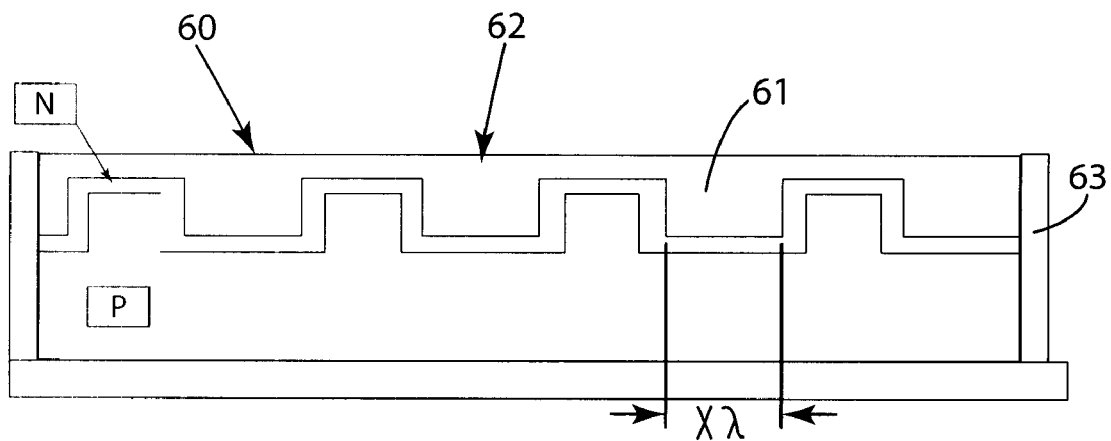
FIG. 8 is a diagrammatic view of the cross-section of high efficiency photovoltaic cell, having a resonate cavity for a selected wavelength of light to increase efficiency of energy conversion at the desired wavelength.
Figure 9:
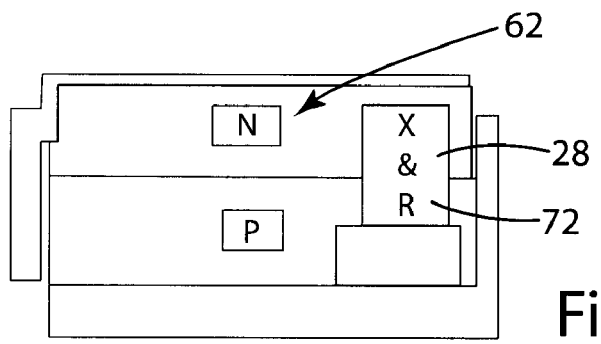
FIG. 9 is a diagrammatic view of the integration of a photovoltaic cell controller and communication transceiver.

The device 80 is placed on the charging station 20, as illustrated in the figures, and, depending on the device 80, size of the charge receiver 60 on the device 80, or the placement of the device on the photon output cell 30, the charging station 20 may turn off some photon transmitters 34 to minimize energy loss and eliminate excessive illumination. More specifically, as illustrated in FIG. 8, different areas, such as the illustrated exemplary first area 44 and second area 46 may be used such that energy is transferred efficiently with minimal loss between the charging station 20 and the charge receiver 60.

The charging station 20 may further include a communication device 28 having a first communication device 48 in or on the charging station 20 and a second communication device in or on the charge receiver 60. The communication device 28 is configured to communicate between the charging station 20 and charge receiver 60 to maximize the efficiency of the charging process and provide a charge status from the charge receiver 60 to the charging station 20. The communication device 28 may also allow the charge receiver 60 to communicate to the charging station an identification of the most efficiency wavelength at which energy should be supplied by the charging station 20 to the charge receiver 60, status of the rechargeable battery 82 including amount of charge needed, as well as identifying when the battery 82 is full or when a trickle charge would be useful. The communication device 28 may also communicate a battery overheat condition, and in response, the charging station 20 reduces the energy provided by the photon cell 30 to the charge receiver 60 or, in some circumstances, eliminates the power all together to the photon cell 30 until the battery overheat condition no longer exists. The communication device 28 may be any device capable of providing easy and efficient communication. In the illustrated embodiment, the communication device 28 has light emitting diodes 14 as well as a receiving mechanism to provide the communication between the two devices 20, 60. Of course, any other method of communicating between the two devices 20, 60 may be used including, without limitation, infrared, Bluetooth, radio, and other wireless signals. Although direct electrical contact may be used to communicate between the charging station 20 and the charge receiver 60, this method is not preferred as it would require precise placement of the device and specific devices.

The controller (not illustrated) generally controls the output of the charging station 20 based upon input from the communication device 28. The controller may have a variety of programs to provide the best charging profile depending upon the input received from the charge receiver 60 which allows it to form a close-loop charging system. As needed, additional control schemes or outputs may be added to the controller. Any controller using any processing device and any program may be used that is capable of performing the features described herein.

Figure 11:
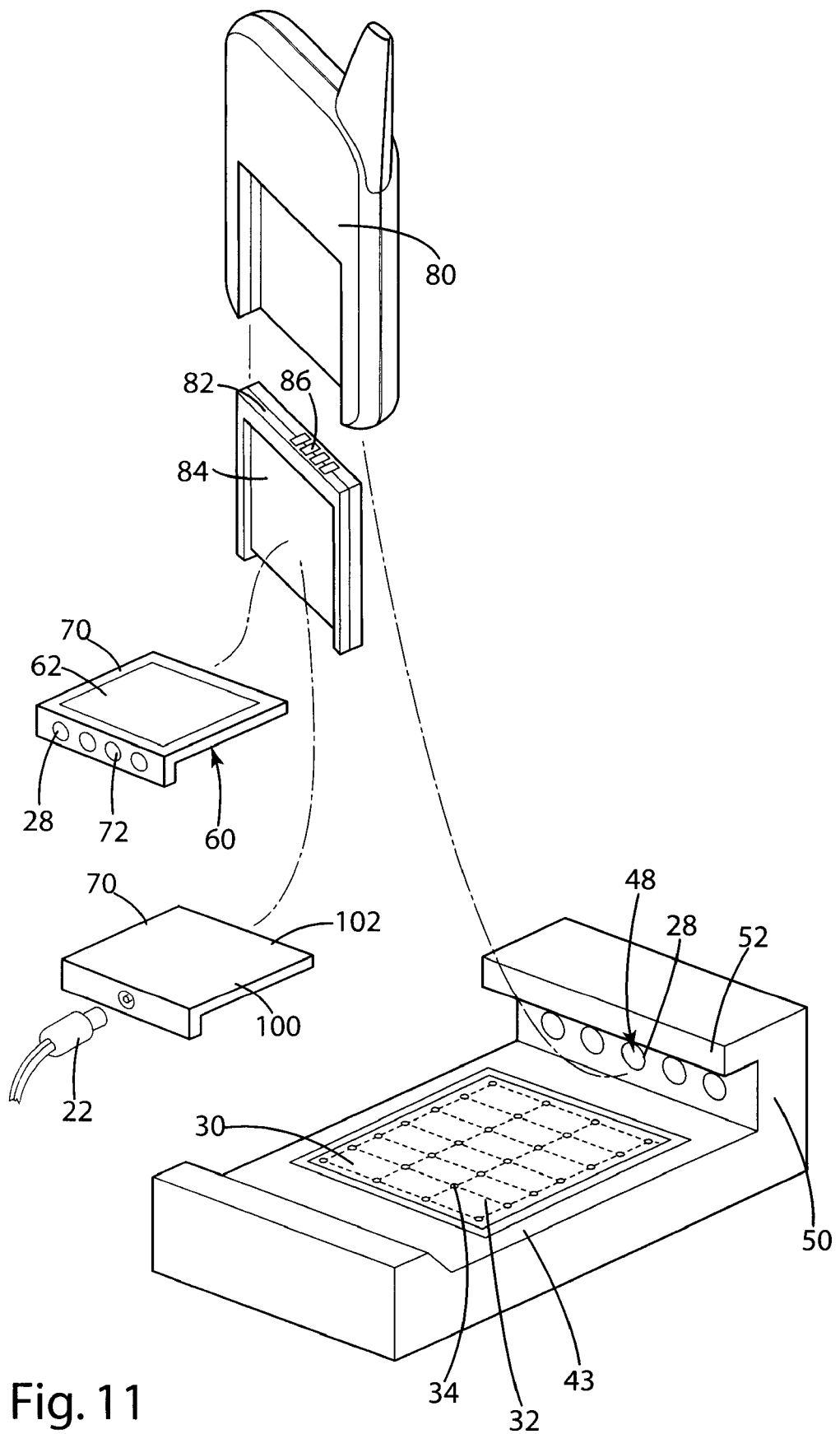
FIG. 11 is a perspective view of an alternative embodiment of the charging system with an exemplary electronic device.

As illustrated in the figures, the charging station 20 may have a variety of sizes, shapes, or configurations. As further illustrated in FIG. 1, the charging station 20 includes a rest surface 50 and a holder 52 which ensure that the device 80, when placed upon the surface 42 of the charging station 20, does not slide off, in particular, when the charging station is angled relative to flat or level. As illustrated in FIG. 11, the charging station 20 may also include an outer lip 43 extending about the perimeter of the photon cell 30, which ensures that a device 80 placed on the photon cell stays in the desired position, without the need for special adaptors or interlocking configurations, such as illustrated in FIG. 3.

The charge receiver 60 may be any charge receiver desired that is capable of converting received photons to energy output for charging a rechargeable battery, and may take on any size, shape, or configuration. The charge receiver 60 includes a photovoltaic receiver 62. The photovoltaic receiver 62 is capable of turning light into energy that the charge receiver 60 uses to charge the battery 82 and/or power the device 80. In the preferred embodiment, the charge receiver 60 is a small photovoltaic card 70 which is modular and allows a modular system where the charge receiver 60 is easily interchangeable for other chargers such as standard electrical chargers 102 or inductive chargers 104. As illustrated in FIG. 8, the photovoltaic receiver 62 is configured to have resonate cavities 61 that are a multiple of the desired wavelength of light (xλ). This allows the cell 62 to be configured to a particular wavelength of light as further described below. To keep light trapped within the cell 62, the cell 62 may include a reflector 63.

The photovoltaic receiver 62 converts light to energy and then provides that energy as electrical output 64 to the electronic device 80. In particular, the charge receiver 60 is configured as a photovoltaic card 70 that interfaces with the rechargeable battery 82 or device 80 on the outer surface. This allows the charge receiver 60 to be modular as well as easily adaptable to existing devices 80. Furthermore, by replacing a battery or battery and battery cover of a device 80, the system 10 may be easily adapted to and used with existing devices. The above described system also allows the photovoltaic receiver 62, when away from the charging station 20, to receive energy from ambient light. When placed upon the charging station 20, the photovoltaic receiver 62 charges the battery 82 faster than when it charges the battery 82 from the ambient light, as the charging station 20 is specifically configured to maximize the efficiency of the charging process.

As illustrated in FIGS. 5 and 7, the use of small photovoltaic cards 70 allows the photovoltaic card to be interchanged with or to be used in coordination with other cards 100. By creating a modular card 70 having in some embodiments a photovoltaic receiver 62 to form the photovoltaic card 70 or, in other embodiments, electrical charging supplies, as illustrated by the card 102 in FIG. 11 and the card 101 in FIG. 7, the electronic device 80 may be easily charged at any time depending upon the available energy source. More specifically, the charging system 10 may provide stackable cards 110 such as illustrated in FIG. 5 that one of the cards is a photovoltaic card 70 while the other card is an electrical charger card 102. Of course these two cards 70, 102 can be incorporated into a single card. Of course, in some embodiments, the charge receiver 60 and specifically the photovoltaic receiver 62 may be formed integrally with the battery, as illustrated in FIG. 2.

The present invention provides a unique modular system that allows charging of the battery 82 or powering of electronic device 80 through the transfer of photovoltaic energy. More specifically, the system 10 is designed to be modular to allow the cards 70 to be easily interchanged. Even without the modular interchangeability of the cards 70, by having a system which provides a charging station 20, capable of providing wireless energy that is not inductive energy but is photon energy, the user is not dependent upon ambient light or direct sunlight, and the system easily and efficiently charges the battery without relying on optimal lighting conditions. In addition, the advantage of using a photovoltaic receiver 62 to charge the battery, the system may also receive charge from ambient light to the rechargeable battery 82 when it is remote from the charging station 20. Currently, no other systems exist for mobile devices that provide wireless energy when ambient light is low, but also use ambient light that is freely available to charge or power the device away from the charging station 20.

Therefore, a user using the device throughout the day may provide a charge overnight using the charge station 20 when no ambient light is available. As the device is used throughout the day, the battery 82 would normally wear down, sometimes to the point where the device becomes inoperable, however, the present invention, using a photovoltaic receiver as the primary charging system allows the electronic device 80 to receive ambient light throughout the day to maintain a least a minimum a trickle charge into the battery to lengthen battery life. While previous inventions have provided separate chargers to boost charge on electronic device such as cell phones, these are bulky and large devices that are not built in and only capable of charging through the ambient light and are not keyed to or in communication with a charger for a rapid charge.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A mobile charging system comprising:
   a charging station including a photon output cell having a plurality of photon transmitters wherein at least two of said photon transmitters provide photons at different primary wavelengths and wherein said charging station maximizes the output of a photon transmitter at a desired wavelength while minimizing the photon output of photon transmitters at different wavelengths;
   a charge receiver capable of receiving photons from said charging station; and
   a communication device having a first portion located on said charging station and a second portion on said charge receiver, said first and second portions in communication regarding the status of one of the charge receiver and charging station.

2. The mobile charging station of claim 1 wherein said communication device communicates the charge status of said charge receiver to said charging station.

3. The mobile charging station of claim 1 wherein said charge receiver communicates the desired wavelengths for a photovoltaic receiver on said charge receiver device to said charging station and wherein said charging station adjusts the wavelength of the output photons to increase efficiency of energy transfer between said charging station and said charge receiver.

4. The mobile charging station of claim 1 wherein said charging station in response to a charge status communicated by said communication device from said charge receiver to said charging station varies the average output wavelength.

5. The mobile charging system of claim 1 wherein said charging station includes at least two photon transmitters and wherein said photon transmitter each produce a maximum energy at different wavelengths.

6. The mobile charging system of claim 1 wherein said charge receiver is coupled to a battery and in electrical communication with said battery.

7. The mobile charging system of claim 6 wherein said charge receiver is easily interchangeable with standard current charger.

8. The mobile charging system of claim 7 wherein said charge receiver is easily interchangeable with an inductive charger.

9. The mobile charging system of claim 6 wherein said battery includes a recess for receiving said charge receiver.

10. The mobile charging system of claim 1 wherein said charge receiver includes a photon cell on a first outer receiver surface and said communication device on an adjacent second outer receiver surface.

11. The mobile charging system of claim 10 wherein said charging station includes a photon output cell on a first outer station surface and said communication device on an adjacent second surface.

12. The mobile charging system of claim 1 wherein said charging station includes a photon output cell and said charge receiver includes a photovoltaic receiver and wherein the surface area of said photon output cell is at least ten percent greater than the surface area of said photovoltaic receiver.

13. The mobile charging system of claim 12 wherein said photon output cell includes a plurality of photon transmitters and wherein said photon output cell turns off any of said plurality of photon transmitters which are not substantially aligned with said photovoltaic receiver.

14. The mobile charging system of claim 1 wherein said charge receiver is combined with a second charge receiver that is not capable of receiving photons and wherein said first and second charge receivers are adjacent, each forming a portion of the outer surface of a mobile device.

15. The mobile charging system of claim 1 wherein said charge receiver is capable of providing a charge from ambient light when it is away from said charging station.

16. The mobile charging system of claim 1 wherein said charge receiver in addition includes a plug for receiving power from an external charger.

17. A mobile charging system comprising:
a charging station having photon transmitters configured to provide photons at different primary wavelengths;
a charge receiver capable of receiving photons from said charging station; and
a communication device having a first portion located on said charging station and a second portion on said charge receiver, said first and second portions in communication regarding the status of one of the charge receiver and charging station, and wherein said charging station in response to a charge status communicated by said communication device from said charge receiver to said charging station varies the average output wavelength.

18. The mobile charging station of claim 17 wherein said charging station maximizes the output of a photon transmitter at a desired wavelength while minimizing the photon output of photon transmitters at different wavelengths.

19. The mobile charging station of claim 17 wherein said charge receiver communicates the desired wavelengths for a photovoltaic receiver on said charge receiver device to said charging station and wherein said charging station adjusts the wavelength of the output photons to increase efficiency of energy transfer between said charging station and said charge receiver.

20. The mobile charging station of claim 17 wherein said charge station is configured to adjust power to the desired photon transmitters such that only photon transmitters that are capable of interacting with the charge receiver device are operation.

* * * * *